F. G. ROSE.
RECORDER.
APPLICATION FILED NOV. 21, 1914. RENEWED AUG. 5, 1915.
1,154,438.
Patented Sept. 21, 1915.
2 SHEETS—SHEET 2.
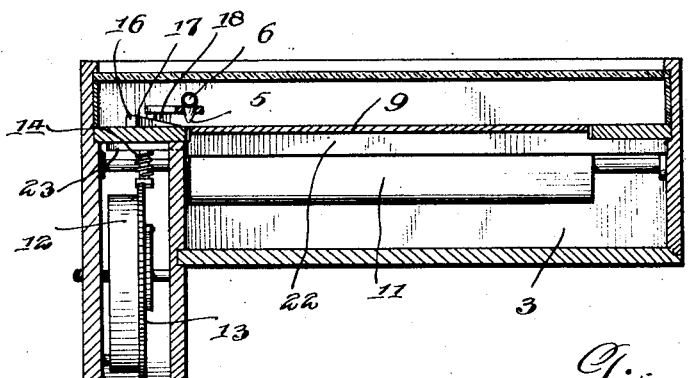
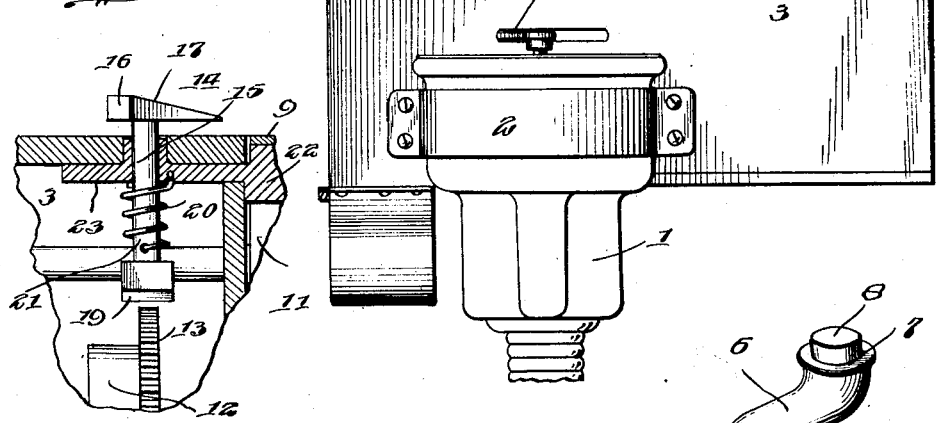
Witnesses
Frederick L. Fox.
Wm A. Smith
Inventor
Fred G. Rose.
By Victor J. Evans.
Attorney

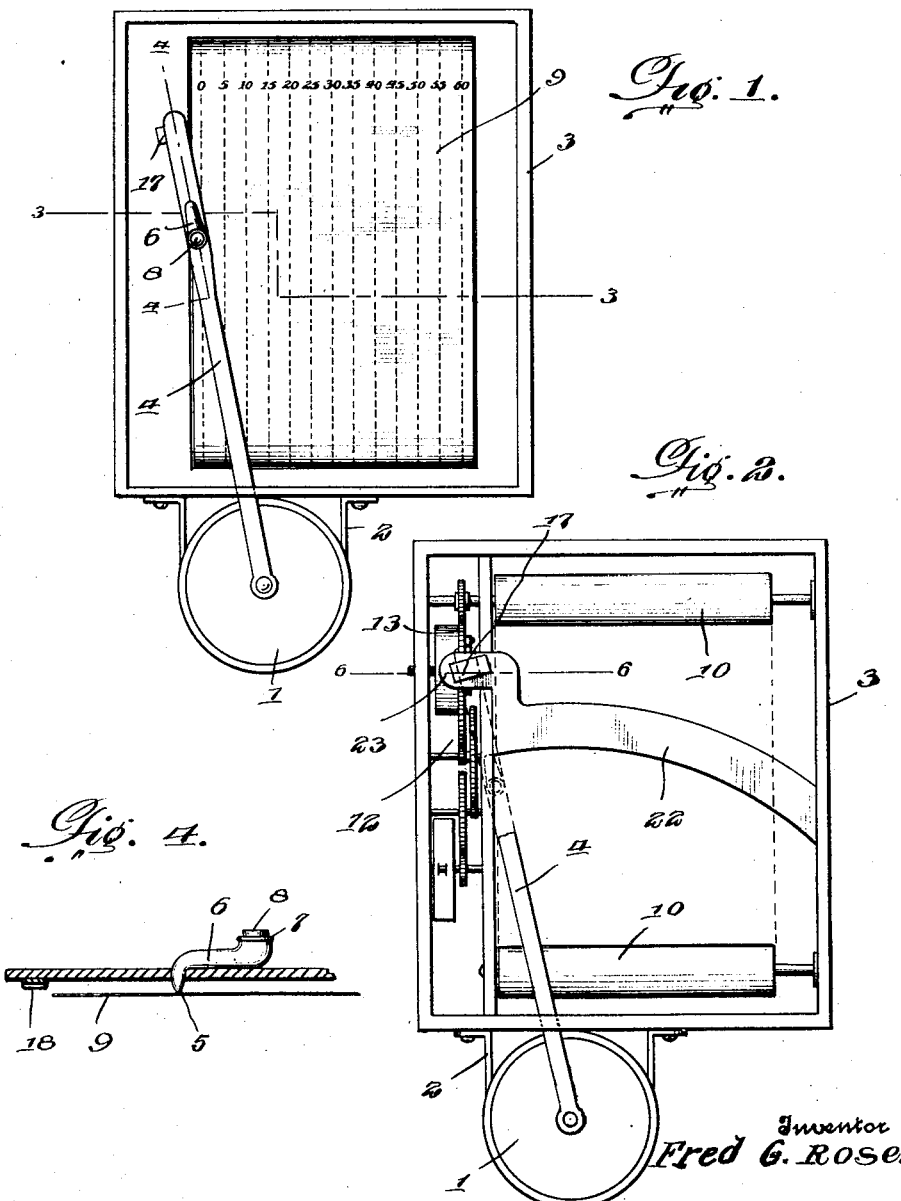

UNITED STATES PATENT OFFICE.

FRED G. ROSE, OF ROCKY FORD, COLORADO.

RECORDER.

1,154,438.      Specification of Letters Patent.      Patented Sept. 21, 1915.

Application filed November 21, 1914, Serial No. 873,369. Renewed August 5, 1915. Serial No. 43,875.

*To all whom it may concern:*

Be it known that I, FRED G. ROSE, a native-born citizen of the United States, residing at Rocky Ford, in the county of Otero and State of Colorado, have invented new and useful Improvements in Recorders, of which the following is a specification.

This invention relates to improvements in recorders for speedometers, tachometers, and the like, wherein a permanent visible signal is given of the maximum speed during a certain period of time.

The primary object of the invention is the provision of a structure wherein all active parts are rendered inoperative upon the stoppage of the driving mechanism.

An object of my invention is the provision of a structure wherein the recording sheet moves at a uniform rate so as to positively record the variations in speed during a period of time.

A further object of the invention is the provision of a structure wherein the speed mechanism for the record sheet and ink distributer is simultaneously rendered inoperative upon the hand of a speedometer or tachometer reaching its normal position.

The invention consists in the features of construction, combination, and arrangement of parts, hereinafter fully described and claimed, reference being had to the accompanying drawings, in which:

Figure 1 is a top plan view showing the recorder attached to a speedometer, the glass top being removed. Fig. 2 is a similar view with the record sheet removed. Fig. 3 is a cross section of Fig. 1 on the line 3—3. Fig. 4 is a longitudinal sectional view on line 4—4 of Fig. 1. Figs. 5, 6, and 7, are detail views.

Referring to the drawings, the numeral 1 designates an ordinary speedometer to which my recorder is attached by means of a band 2.

My recorder comprises a casing 3 through which passes the hand 4 of the speedometer so that the free end of the hand will be disposed at all times within the casing. The free end of the hand is apertured so as to receive the pointed end 5 of an ink distributer 6 having one of its ends provided with a filling opening 7 closed by a cork 8. The pointed extremity 5 is provided with a capillary passage through which the ink feeds by the capillary attraction between the film of ink and the surface of the record sheet 9. This record sheet is subdivided so as to indicate the number of miles which, in the drawings, comprises eleven subdivisions, indicating five to sixty miles. The record sheet is in the form of a roll and is positioned upon a roller 10 from whence the sheet is fed to a second spaced roller 11 which is uniformly driven by a clock mechanism 12 which has a gear 13 disposed adjacent to an automatic stop 14. This automatic stop comprises a plunger 15 having one of its extremities enlarged as shown at 16 and provided with an inclined surface 17 adapted to coöperate with an inclined surface 18 formed on the under surface of the hand. The opposite remaining extremity of the plunger is beveled as shown at 19 so as to engage the teeth formed upon the periphery of the gear 13. A coiled retractile spring 20 encircles the shank 21 of the plunger so as to elevate the head 16 into its normal position. This automatic stop mechanism is secured to the anvil 22 by means of a perforated plate 23, the anvil 22 supporting the intermediate portion of the record sheet immediately below the ink distributer.

I will now describe the operation of my device as applied to a speedometer of an automobile.

As the vehicle is accelerated, the hand 4 moves over the record sheet in proportion to the speed of the vehicle, the ink flowing from the distributer marking the speed variations upon the record sheet which is moved at a uniform rate by the clock mechanism. Upon stoppage of the vehicle, the hand returns to its normal position, and, in so doing, depresses the plunger through the action of the inclined surfaces 17 and 18 and as a result of the wedging action, the extremity 19 is forced into engagement with the gear 13 thus stopping the clock mechanism and simultaneously with this operation, the point of the ink distributer is thrown out of engagement with the record sheet through the end of the hand being elevated from a point adjacent the shaft where the hand is attached to the speedometer, the resiliency of the hand allowing for this deflection. It will be noticed that there will be given a written record of the variations in the speed of the vehicle and in addition the pointer will give a visible indication of the actual speed at any time.

Having described my invention, what I claim is:

1. In combination with the hand of a speedometer, tachometer, or the like, of a recorder therefor comprising a casing through which said hand passes, a record sheet, clock mechanism for feeding said sheet, means for making a visible mark on said sheet, and means whereby the clock mechanism and last mentioned means can be simultaneously rendered inoperative, said means including a plunger adapted to be depressed by said hand.

2. A recorder comprising a record sheet, a hand movable over said sheet, an ink distributer carried by one end thereof, clock mechanism for feeding said sheet, and a plunger actuated by said hand when in normal position for simultaneously stopping said clock mechanism and elevating said ink distributer out of contact with said sheet.

3. An automatic stop for the feed mechanism, of a record sheet, of a recorder comprising in combination with a marking hand having an inclined under surface of a plunger having an inclined upper end adapted to coöperate with the upper surface of the hand and its lower end adapted to engage a moving portion of the feed mechanism upon the hand reaching its normal position.

4. A recorder comprising in combination, a record sheet, a pair of rolls over which said sheet travels, a clock mechanism for turning one of the rolls, a marking hand movable over said sheet, a plunger having one end provided with an inclined surface adapted to coöperate with said hand for forcing said plunger into a position to stop said clock mechanism, and a coil spring for returning said plunger to normal position.

In testimony whereof I affix my signature in presence of two witnesses.

FRED G. ROSE.

Witnesses:
G. M. COFFMAN,
OTTO FERRIL.